United States Patent
Rajavi et al.

(10) Patent No.: US 9,258,021 B1
(45) Date of Patent: Feb. 9, 2016

(54) LOW-POWER RX SYNTHESIZER SHARING TX HARDWARE

(71) Applicant: QUALCOMM Incorporated, San Diego, CA (US)

(72) Inventors: Yashar Rajavi, Mountain View, CA (US); Alireza Khalili, Sunnyvale, CA (US); Muhammad Adnan, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/607,775

(22) Filed: Jan. 28, 2015

(51) Int. Cl.
*H04B 1/40* (2015.01)
*H04B 1/04* (2006.01)

(52) U.S. Cl.
CPC .......... *H04B 1/04* (2013.01); *H04B 2001/0491* (2013.01)

(58) Field of Classification Search
CPC .................................. H04B 1/38; H04B 1/403
USPC ..................... 455/73, 76, 84, 86, 127.5, 343.1
See application file for complete search history.

(56) References Cited

U.S. PATENT DOCUMENTS

| | | | |
|---|---|---|---|
| 2005/0095990 A1 | 5/2005 | Yip | |
| 2006/0073793 A1* | 4/2006 | Welland | H04B 1/403 455/86 |
| 2007/0238428 A1 | 10/2007 | Fisher | |
| 2007/0298729 A1* | 12/2007 | Kappes | G06F 1/3203 455/84 |
| 2008/0123724 A1 | 5/2008 | Yen et al. | |
| 2008/0317185 A1* | 12/2008 | Mueller | H03D 3/006 375/376 |
| 2009/0042527 A1 | 2/2009 | Niknejad | |
| 2009/0168939 A1 | 7/2009 | Constantinidis et al. | |

* cited by examiner

*Primary Examiner* — Nguyen Vo
(74) *Attorney, Agent, or Firm* — Mahamedi Paradice LLP (57) ABSTRACT

An analog front-end (AFE) for a communications device includes a low-power frequency synthesizer with reduced footprint. The AFE includes a first frequency synthesizer and a second frequency synthesizer. The first frequency synthesizer is coupled to a transmit (TX) chain and to a receive (RX) chain of the AFE. The first frequency synthesizer is to generate a first local oscillator (LO) signal for transmitting or receiving carrier signals when the device is in a normal operating mode. The second frequency synthesizer is coupled to the RX chain and shares one or more components of the TX chain. The second frequency synthesizer is to utilize the one or more shared components to generate a second LO signal for receiving carrier signals when the device operates in a low-power mode. For example, the one or more shared components may include a voltage source and/or one or more inductors.

30 Claims, 8 Drawing Sheets

LOW-POWER RX SYNTHESIZER SHARING TX HARDWARE

TECHNICAL FIELD

The present embodiments relate generally to frequency synthesizers, and specifically to systems and methods for reducing the size of low-power frequency synthesizers.

BACKGROUND OF RELATED ART

Figure 1:
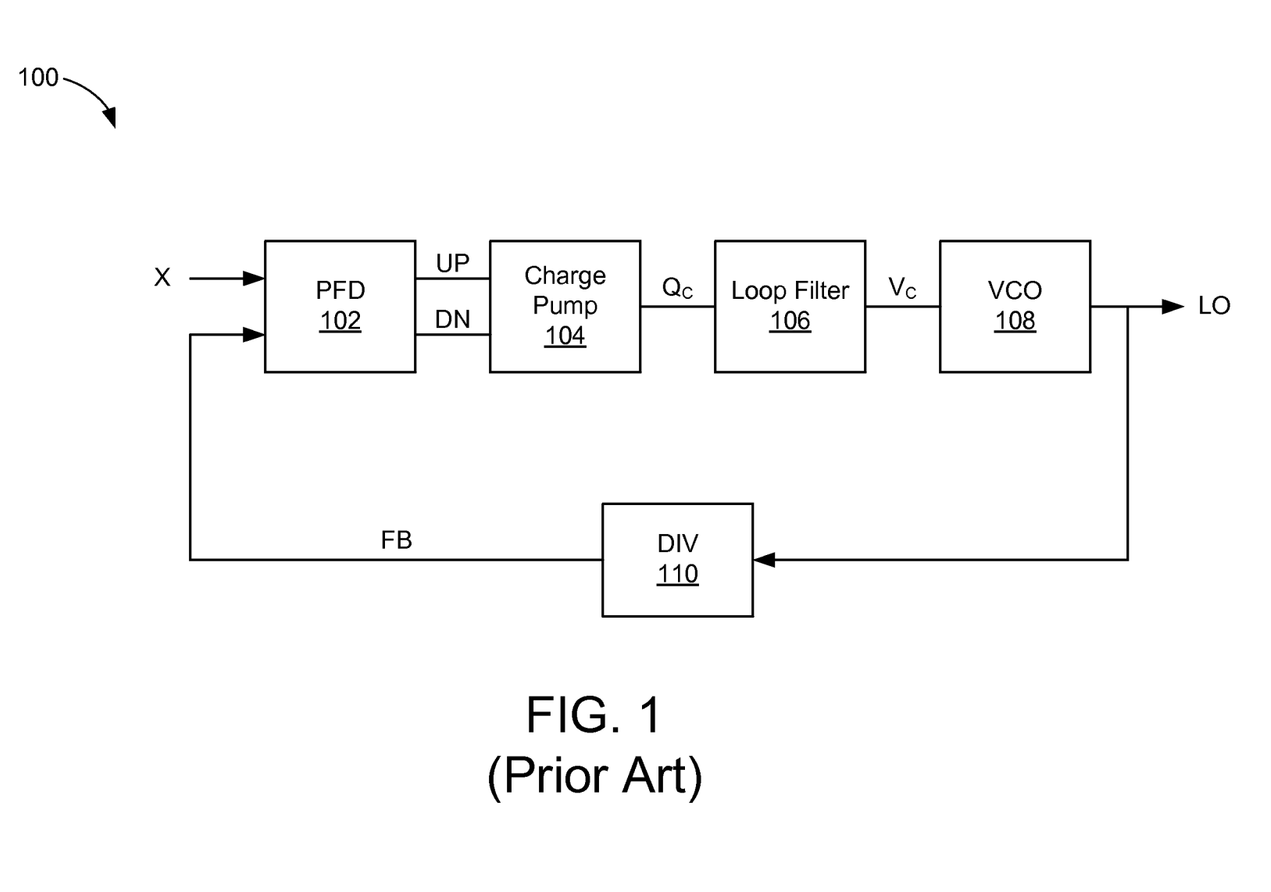
FIG. 1 shows a block diagram of a conventional frequency synthesizer.

Frequency synthesizers may be used to generate high frequency signals based on a lower frequency reference signal. For example, FIG. 1 shows a block diagram of a conventional phase-locked loop (PLL) circuit configured as a frequency synthesizer 100. Synthesizer 100 includes a phase and frequency detector (PFD) 102, a charge pump 104, a loop filter 106, a voltage-controlled oscillator (VCO) 108, and a frequency divider (DIV) 110. A master oscillator (e.g., crystal oscillator) may provide an input (X) to be used as a reference clock signal by the synthesizer 100. The PFD 102 compares the relative timing (e.g., phase difference) between the edges of the reference signal X and a feedback signal (FB) to generate "up" (UP) and "down" (DN) control signals. Charge pump 104 converts the UP and DN control signals to a charge ($Q_C$) that is proportional to the phase difference of signals X and FB. The charge $Q_C$ is filtered (e.g., integrated) by the loop filter 106 and provided as a control voltage ($V_C$) to the VCO 108. The VCO 108 then generates a local oscillator signal (LO) having a frequency based on the control voltage $V_C$. The local oscillator signal LO is passed through a frequency divider 110 (e.g., to scale the frequency of LO to that of X) and fed back into the synthesizer 100 as the feedback signal FB.

Frequency synthesizers are often found in the analog front-end (AFE) of communications devices, and may be used for transmitting and/or receiving data signals. More specifically, a conventional frequency synthesizer may be coupled to both a transmit (TX) chain of the AFE and a receive (RX) chain of the AFE. Along the TX chain, the local oscillator signal LO may be used to up-convert an outgoing data signal to a carrier frequency. Along the RX chain, the local oscillator signal LO may be used to down-convert a received carrier signal to a frequency suitable for processing by the communications device. A modern communications device may enter a low-power (e.g., "sleep") mode wherein the device does not transmit any data, and only periodically enables reception of broadcast data (e.g., beacon frames containing DTIM information) for purposes of maintaining a connection with a corresponding network and/or device.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

An analog front-end (AFE) for a communications device includes a low-power frequency synthesizer with reduced footprint. The AFE includes a first frequency synthesizer and a second frequency synthesizer. The first frequency synthesizer is coupled to a transmit (TX) chain and to a receive (RX) chain of the AFE. The first frequency synthesizer is to generate a first local oscillator (LO) signal for transmitting or receiving carrier signals when the device operates in a normal operating mode. The second frequency synthesizer is coupled to the RX chain and shares one or more components of the TX chain. The second frequency synthesizer utilizes the one or more shared components to generate a second LO signal for receiving carrier signals when the device operates in a low-power mode. For some embodiments, the second LO signal may be used only for receiving beacon frames during one or more delivery traffic indication map (DTIM) periods.

The TX chain of the AFE may comprise a mixer powered by a voltage source coupled to a set of inductors. The mixer may be deactivated when the device operates in the low-power mode. For some embodiments, at least one of the voltage source or the set of inductors may be shared by the second frequency synthesizer. For example, the second frequency synthesizer includes a voltage-controlled oscillator (VCO) to generate the second LO signal based at least in part on oscillating current in an inductor-capacitor (LC) tank circuit. For some embodiments, an inductance of the LC tank circuit may be provided at least in part by the shared set of inductors of the TX chain.

The VCO may include a set of capacitors to provide a capacitance of the LC tank circuit and to control an oscillating frequency of the VCO when the device operates in the low-power mode. Furthermore, the VCO may be deactivated when the device operates in the normal operating mode. For some embodiments, the set of capacitors may shift down a center frequency of the LC tank circuit when the device is in the normal operating mode.

Still further, for some embodiments, the shared voltage source of the TX chain may be configured to provide one of a plurality of voltages based at least in part on an operating mode of the device. For example, the shared voltage source may be configured to provide a voltage suitable for operation of the mixer when the device is operating in the normal operating mode. Alternatively, the shared voltage source may be configured to provide a voltage suitable for operating the VCO when the device operates in the low-power mode.

The voltage source and inductors of a frequency synthesizer may occupy a substantial portion of the die area of the frequency synthesizer. Moreover, low-power frequency synthesizers are typically used only for receiving data while a communications device is operating in a low-power mode (e.g., no data is being transmitted). Thus, by configuring a low-power frequency synthesizer to share one or more components (e.g., including a voltage source and/or one or more inductors) with the TX chain of an AFE, the die size or footprint of the AFE may be reduced without sacrificing performance.

BRIEF DESCRIPTION OF THE DRAWINGS

The present embodiments are illustrated by way of example and are not intended to be limited by the figures of the accompanying drawings, where.

Like reference numerals refer to corresponding parts throughout the drawing figures.

DETAILED DESCRIPTION

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices may be shown in block diagram form to avoid obscuring the present disclosure. The interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

Figure 2:
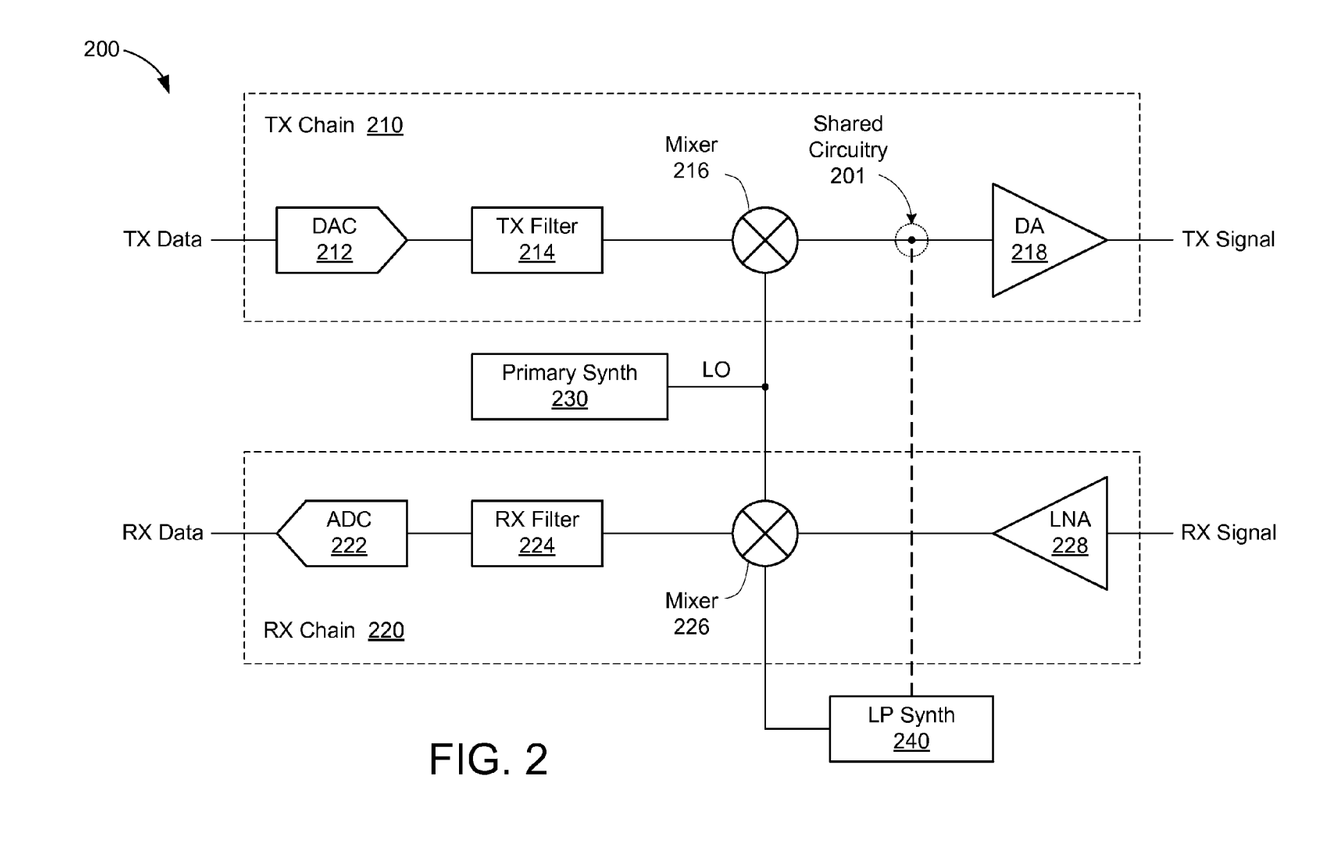
FIG. 2 shows a block diagram of an analog front-end (AFE) circuit, in accordance with some embodiments.

FIG. 2 shows a block diagram of an analog front-end (AFE) circuit 200, in accordance with some embodiments. The AFE 200 includes a transmit (TX) chain 210, a receive (RX) chain 220, a primary synthesizer 230, and a low-power (LP) synthesizer 240. For some embodiments, the AFE 200 may be operable in a "normal" operating mode or a "low-power" mode. For example, in the normal operating mode, the AFE 200 is capable of transmitting outgoing (TX) data and/or receiving incoming (RX) data. However, when operating in low-power mode, the AFE 200 may not transmit nor receive data. Rather, the AFE 200 may wake up periodically only to receive connection information (e.g., in the form of beacon frames) for purposes of maintaining a connection with an associated network and/or device. For example, in accordance with the IEEE 802.11 specification, the AFE 200 may wake up only to receive delivery traffic indication map (DTIM) information from an access point every few target beacon transmission time (TBTT) intervals.

The TX chain 210 includes a digital-to-analog converter (DAC) 212, a TX filter 214, a mixer 216, and a driver amplifier (DA) 218. The TX chain 210 is generally used for transmitting outgoing (TX) data to another device (not shown). The TX data may be provided to AFE 200 by a baseband processor (not shown for simplicity). For example, the DAC 212 converts the TX data to an analog data signal, which is further via the TX filter 214. The data signal is then up-converted to a carrier frequency by the mixer 216. More specifically, the mixer 216 mixes the outgoing data signal with a local oscillator (LO) signal generated by the primary synthesizer 230 to produce a high-frequency modulated carrier signal. The carrier signal is amplified by the DA 218 and subsequently output as a TX signal.

The RX chain 220 includes an analog-to-digital converter (ADC) 222, an RX filter 224, a mixer 226, and a low-noise amplifier (LNA) 228. The RX chain 220 is used for receiving incoming (RX) data (e.g., from another device). For example, the LNA 228 amplifies a received carrier signal (RX signal) and forwards the RX signal to the mixer 226. The mixer 226 down-converts the RX signal to a frequency suitable for processing by the AFE 200. More specifically, the mixer 226 mixes the RX signal with an LO signal provided by the primary synthesizer or the LP synthesizer 240 to produce a lower-frequency data signal. The data signal is then filtered by the RX filter 224 and converted to a digital bitstream of RX data via the ADC 222. The RX data may then be provided to a baseband processor (not shown for simplicity).

As described above, the AFE 200 may be operable in a normal operating mode or a low-power mode. During the normal operating mode, the AFE 200 relies on the primary synthesizer 230 to generate an LO signal that may be used for transmitting (e.g., up-converting) and receiving (e.g., down-converting) carrier signals. The LP synthesizer 240 may operate at a lower frequency than the primary synthesizer 230, and may therefore consume less power than the primary synthesizer 230. Thus, the LP synthesizer 240 may be used in lieu of the primary synthesizer 230 when the AFE 200 operates in the low-power mode.

For some embodiments, the LP synthesizer 240 may share circuitry 201 with the TX chain 210. For example, when the AFE 200 operates in low-power mode, the components of the TX chain 210 are generally inactive (e.g., because no outgoing data is being transmitted by an underlying communications device). Accordingly, the LP synthesizer 240 may leverage one or more "unused" components of the TX chain 210 (e.g., circuitry not currently being used for the transmission of data) to generate an LO signal when the AFE is in the low power mode. For some embodiments, the shared circuitry 201 may include a voltage source and/or one or more inductors provided along the TX chain 210 between the mixer 216 and the DA 218. Sharing circuitry between the TX chain 210 and the LP synthesizer 240 allows the AFE 200 to have a smaller footprint and/or occupy less die space in the underlying communications device.

Figure 3:
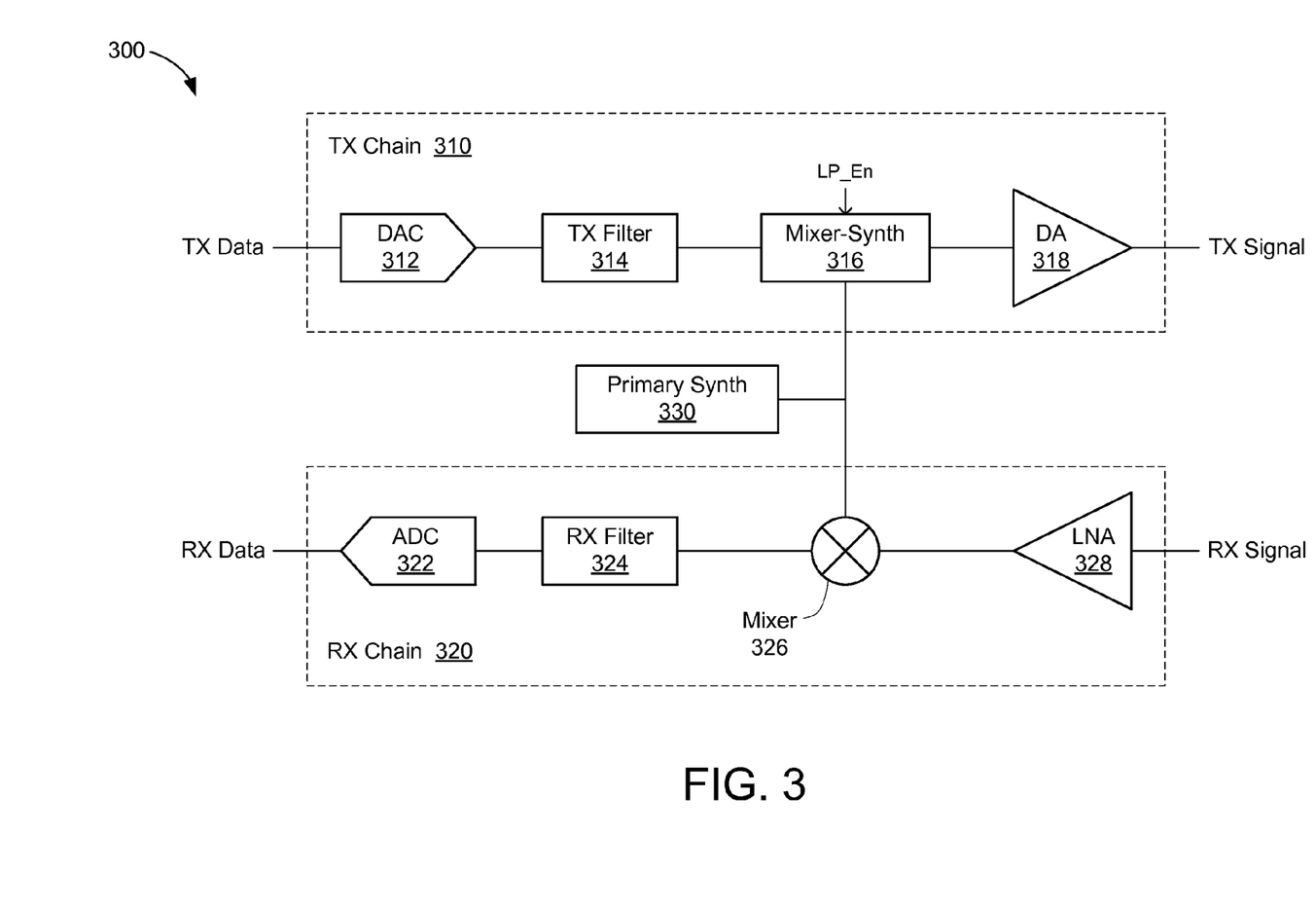
FIG. 3 shows a block diagram of an AFE circuit including a dual-mode synthesizer, in accordance with some embodiments.

FIG. 3 shows a block diagram of an AFE 300 including a dual-mode synthesizer, in accordance with some embodiments. The AFE 300 includes a TX chain 310, an RX chain 320, and a primary synthesizer 330. The TX chain 310 includes a DAC 312, a TX filter 314, a dual-mode synthesizer 316, and a DA 318. The RX chain 320 includes an ADC 322, an RX filter 324, a mixer 326, and an LNA 328. For example embodiments, the RX chain 320 may be substantially similar to, and perform substantially the same function as, the RX chain 220 described above with respect to FIG. 2.

The dual-mode synthesizer 316 may be operable as either a mixer or a frequency synthesizer depending on an operating mode of the AFE 300, for example, in response to a mode selection signal (LP_En). For example, LP_En may be deasserted when the AFE 300 is in a normal operating mode, causing the dual-mode synthesizer 316 to operate as a mixer or up-converter. On the other hand, LP_En may be asserted when the AFE 300 operates in low-power mode, causing the dual-mode synthesizer 316 to operate as a low-power frequency synthesizer. For some embodiments, at least some of the circuitry used by the dual-mode synthesizer 316 to perform a mixer operation is also used when performing a frequency synthesizer operation. For example, such circuitry may include a voltage source and/or one or more inductors.

During the normal operating mode, TX data may be transmitted via the TX chain 310 (e.g., to another device using, for example, an antenna, not shown for simplicity). For example, the DAC 312 converts the TX data to an analog data signal, which is filtered via the TX filter 314. During this time, the dual-mode synthesizer 316 may be configured to operate as a mixer. Thus, the dual-mode synthesizer 316 mixes the outgoing data signal with an LO signal generated by the primary synthesizer 330 to produce an up-converted carrier signal. The carrier signal is amplified by the DA 318 and subsequently output as a TX signal.

When operating in low-power mode, TX data may not be transmitted via the TX chain 310. Accordingly, the dual-mode synthesizer 316 may be configured to operate as a low-power frequency synthesizer to receive connection information (e.g., provided in beacon frames) for purposes of maintaining a connection to a corresponding network and/or device. For example, the LNA 328 amplifies a received RX signal (e.g., beacon frame) and forwards the RX signal to the mixer 326. The mixer 326 mixes the RX signal with an LO signal provided by the dual-mode synthesizer 316 to produce a down-converted data signal. The data signal is then filtered by the RX filter 324 and converted to a digital bitstream of RX data via the ADC 322.

Figure 4:
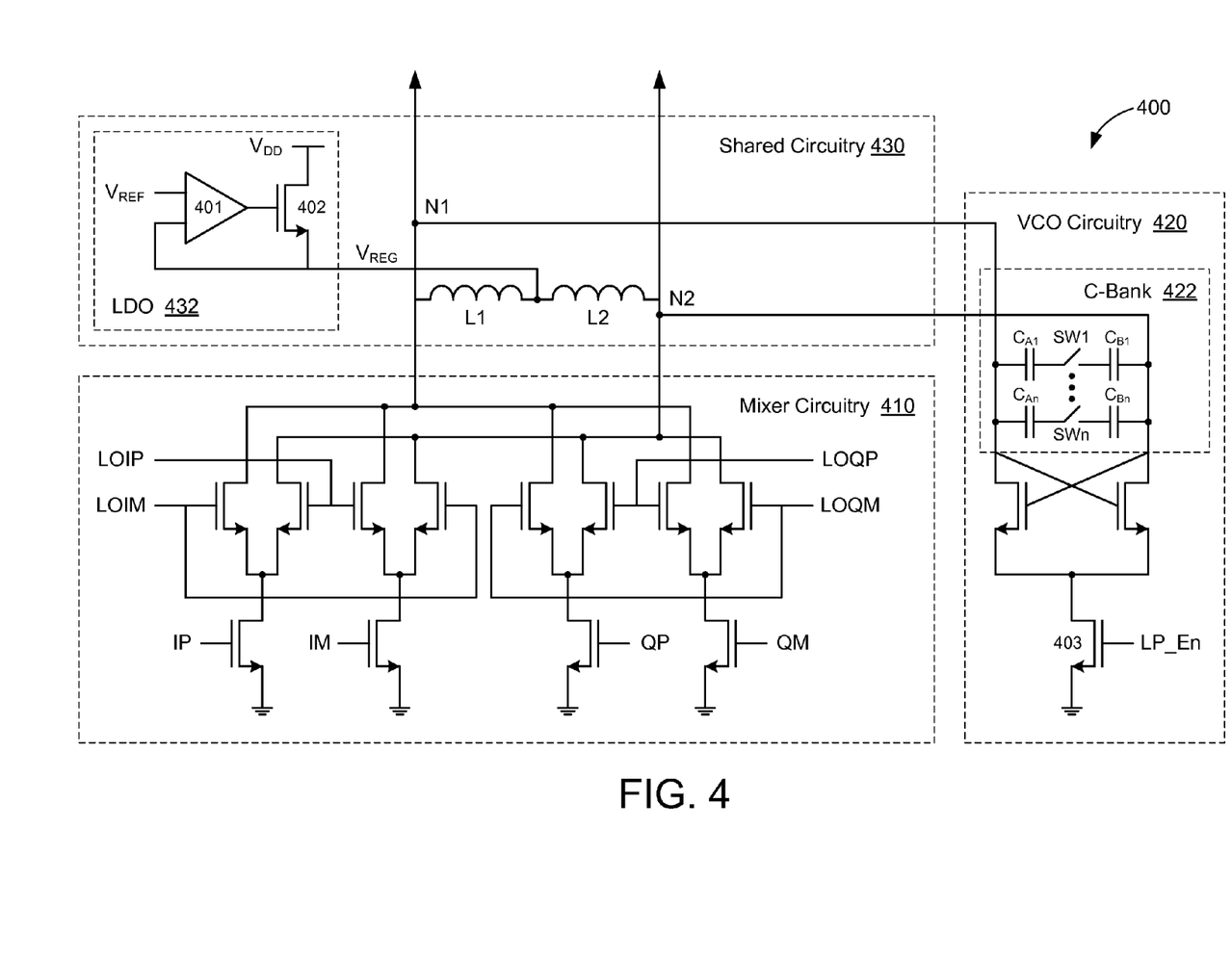
FIG. 4 shows a more detailed example of a dual-mode synthesizer that is operable as a mixer or as a frequency synthesizer, in accordance with some embodiments.

FIG. 4 shows a more detailed example of a dual-mode synthesizer 400 that is operable as a mixer or as a frequency synthesizer, in accordance with some embodiments. The dual-mode synthesizer 400 includes mixer circuitry 410, VCO circuitry 420, and a set of shared circuitry 430. Although not shown, for simplicity, the dual-mode synthesizer 400 may include additional circuitry for operating as a frequency synthesizer (e.g., as shown in FIG. 1) and/or as a mixer.

The shared circuitry 430 includes a low-dropout regulator (LDO) 432 and a set of inductors L1 and L2. The LDO 432 includes a differential amplifier 401 coupled to a voltage source $V_{DD}$ through a transistor 402. More specifically, the LDO 432 maintains an output voltage $V_{REG}$ in response to a reference voltage $V_{REF}$. For example, if the difference between the output voltage $V_{REG}$ and the reference voltage $V_{REF}$ increases beyond a threshold, the amplifier 401 changes the gate voltage of the transistor 402 to maintain the output voltage $V_{REG}$ at a desired voltage level.

For some embodiments, the shared circuitry 430 may be selectively utilized by either the mixer circuitry 410 or the VCO circuitry 420 depending on a selected mode of operation. For example, the mixer circuitry 410 may use the shared circuitry 430 during a normal operating mode to up-convert outgoing data signals to a carrier frequency. On the other hand, the VCO circuitry 420 may use the shared circuitry 430 to generate an LO signal used for down-converting received carrier signals when operating in a low-power mode.

During the normal operating mode, the dual-mode synthesizer 400 functions as a mixer. Thus, the LDO 432 may be configured to supply power to the mixer circuitry 410. For some embodiments, the LDO 432 may be biased to produce an output voltage $V_{REG}$ that is suitable for operation of the mixer circuitry 410 (e.g., $V_{DD}$). The output voltage $V_{REG}$ is supplied to the mixer circuitry 410 through the inductors L1 and L2. For some embodiments, the VCO circuitry 420 may be deactivated when the dual-mode synthesizer 400 operates as a mixer. For example, the VCO circuitry 420 may be deactivated by deasserting the LP_En signal (e.g., to logic low), thus turning off transistor 403.

When operating in low-power mode, the dual-mode synthesizer 400 functions as a frequency synthesizer. Thus, the LDO 432 may be configured to supply power to the VCO circuitry 420. The VCO circuitry 420 may be activated by asserting the LP_En signal (e.g., to logic high), thus turning on transistor 403. For some embodiments, the LDO 432 may be biased to produce an output voltage $V_{REG}$ that is suitable for operation of the VCO circuitry 420 (e.g., $<V_{DD}$). The output voltage $V_{REG}$ is supplied to the VCO circuitry 420 through inductors L1 and L2. For some embodiments, the mixer circuitry 410 may be deactivated when the dual-mode synthesizer 400 operates as a frequency synthesizer. For example, the mixer circuitry 410 may be deactivated by pulling the gate and source voltages of each of its transistors to ground potential.

The VCO circuitry 420 includes a bank of capacitors 422 which may be used in conjunction with the inductors L1 and L2 to produce an oscillating signal (e.g., an LO signal). For example, the bank of capacitors 422 and the inductors L1 and L2 may collectively form an LC tank. More specifically, the capacitance of the LC tank may be based on the capacitance of the capacitor bank 422, and the inductance of the LC tank may be based on the inductance of the inductors L1 and L2. Further, for some embodiments, the bank of capacitors 422 may be used to control the oscillation frequency of the LC tank. For example, a number of capacitors may be switchably coupled to, or decoupled from, the capacitor bank 422 to provide the appropriate capacitance for the LC tank to oscillate at a desired frequency. For example, a number of switches SW1-SWn may be used to selectively couple a corresponding number of capacitor pairs $C_{A1}/C_{B1}$ to $C_{An}/C_{Bn}$ between nodes N1 and N2 of the shared circuitry 430. The switches SW1-SWn may be controlled by a corresponding number of control signals (not shown for simplicity) that may be generated, for example, by the control voltage $V_C$ (see also FIG. 1). When the dual-mode synthesizer 400 operates as a mixer, the center frequency of the LC tank may be shifted down using the capacitor bank 422 (e.g., by selectively coupling and/or decoupling capacitors).

As described above, the shared circuitry 430 may be used to power the mixer circuitry 410 during a normal operating mode, and may be used to power the VCO circuitry 420 and provide at least a portion of the LC tank when operating in a low-power mode. Moreover, the LDO 432 and inductors L1 and L2 typically occupy a large die area. Thus, using the shared circuitry 430 during both the normal operating mode and the low-power mode may reduce the overall size and/or footprint of a corresponding AFE in which the dual-mode synthesizer 400 is implemented.

Figure 5:
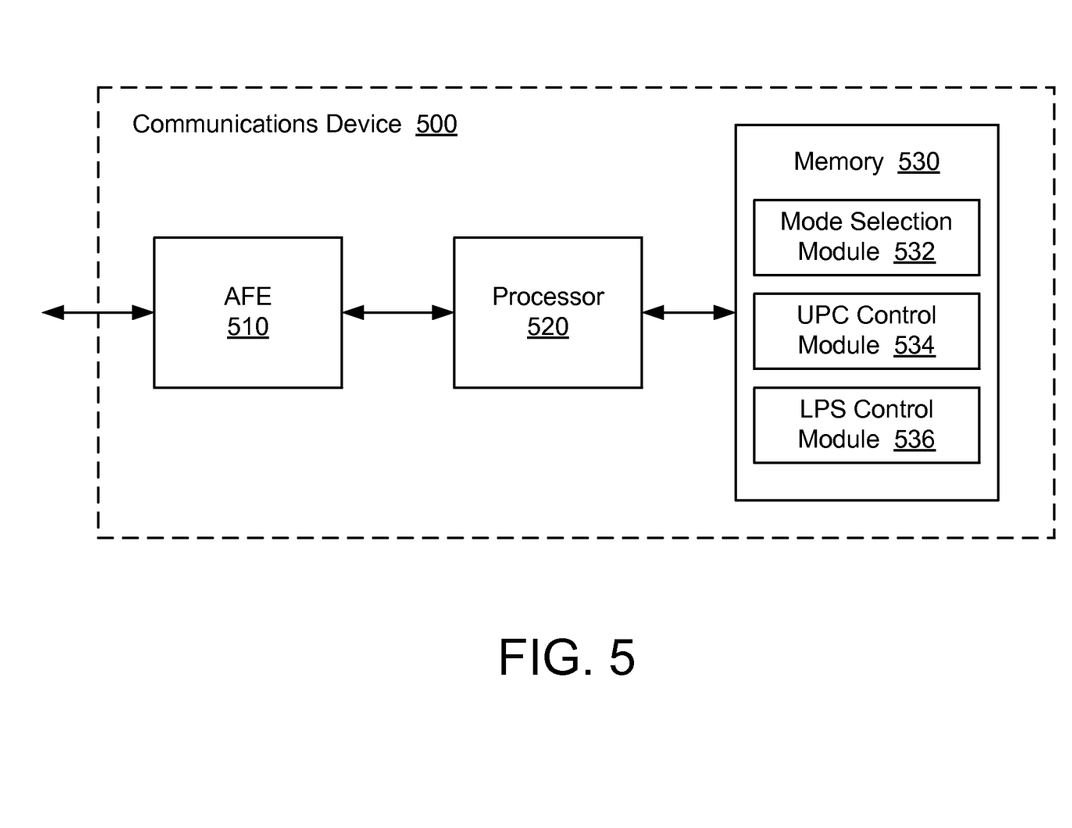
FIG. 5 shows a block diagram of a communications device within which some embodiments may be implemented.

FIG. 5 shows a block diagram of a communications device 500 within which some embodiments may be implemented. The communications device 500 includes an AFE 510, a processor 520, and a memory 530. For some embodiments, the AFE 510 may include a low-power frequency synthesizer that shares circuitry with a TX chain of the AFE 510 (e.g., such as AFE 200 described above with respect to FIG. 2). Alternatively, the AFE 510 may include a dual-mode synthesizer that is operable as a mixer or as a low-power frequency synthesizer (e.g., such as AFE 300 described above with respect to FIG. 3). For purposes of discussion herein, the AFE 510 is shown in FIG. 5 as being coupled to processor 520. For actual embodiments, the AFE 510, processor 520, and/or memory 530 may be connected together using one or more buses (not shown for simplicity).

Memory 530 may include a non-transitory computer-readable medium (e.g., one or more nonvolatile memory elements, such as EPROM, EEPROM, Flash memory, a hard drive, etc.) that can store the following software modules:
- a mode selection module 532 to operate the communications device 500 in a normal operating mode or a low-power mode;
- an up-converter (UPC) control module 534 to control a mixing/up-converting operation of the AFE 510 based at least in part on the selected mode of operation; and
- a low-power synthesizer (LPS) control module 536 to control a frequency synthesizing operation of the AFE 510 based at least in part on the selected mode of operation.

Each software module includes instructions that, when executed by processor 520, causes the communications device 500 (specifically, the AFE 510) to perform the corresponding functions. The non-transitory computer-readable medium of memory 530 thus includes instructions for performing all or a portion of the operations described below with respect to FIGS. 6-8.

Processor 520, which is shown in the example of FIG. 5 as coupled to AFE 510 and to memory 530, may be any suitable one or more processors capable of executing scripts or instructions of one or more software programs stored in communications device 500 (e.g., within memory 530). For example, processor 520 may execute the mode selection module 532 to operate the communications device 500 in a normal operating mode or a low-power mode. Processor 520 may also execute the UPC control module 534 to control a mixing/up-converting operation of the AFE 510 based at least in part on the mode of operation. Still further, the processor 520 may execute the LPS control module 536 to control a frequency synthesizing operation of the AFE 510 based at least in part on the selected mode of operation.

Figure 6:
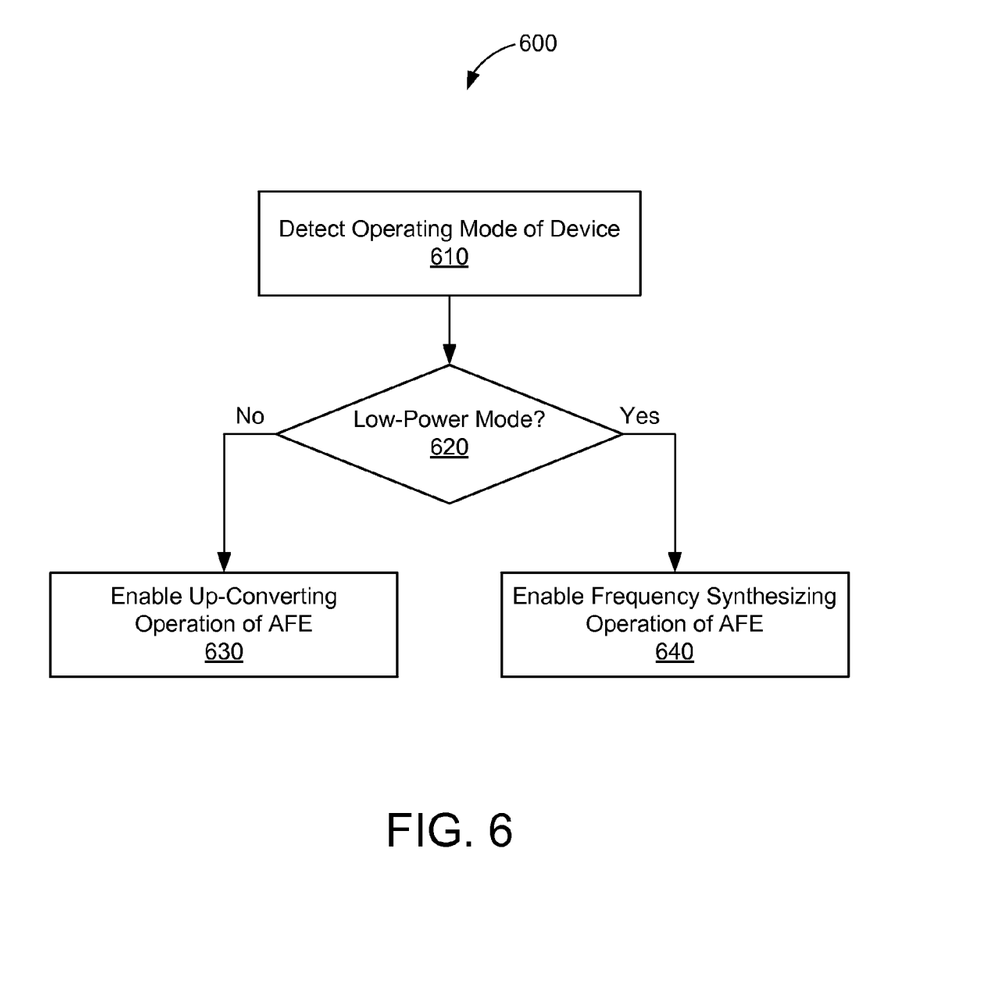
FIG. 6 shows an illustrative flow chart depicting a method of operating a communications device including a dual-mode synthesizer.

FIG. 6 shows an illustrative flow chart depicting a method 600 of operating a communications device including a dual-mode synthesizer. For example, with reference to FIG. 5, the method 600 may be implemented by the processor 520 of communications device 500. The processor 520 may first execute the mode selection module 532 to detect an operating mode of the device 500 (610). For example, the processor 520 may determine whether the device 500 is in a normal operating mode or a low-power mode.

If the device 500 is in a normal operating mode (620), the processor 520 may enable an up-converting operation of the AFE 510 (630). As described above, the communications device 500 may be configured to transmit (e.g., via a TX chain) and/or receive (e.g., via an RX chain) carrier signals during the normal operating mode. Thus, the processor 520, in executing the UPC control module 534, may enable the AFE 510 to up-convert outgoing data signals when the device 500 is in the normal operating mode. Furthermore, the mode selection module 532, as executed by processor 520, may activate a primary synthesizer of the AFE 510 to generate an LO signal to be used for the mixing/up-converting operation.

If the device 500 is operating in a low-power mode (620), the processor 520 may enable a frequency synthesizing operation of the AFE 510 (640). As described above, the communications device 500 may be configured to only receive (e.g., via the RX chain) connection information (e.g., beacon frames containing DTIM information) when operating in the low-power mode. Thus, the processor 520, in executing the LPS control module 536, may enable the AFE 510 to generate an LO signal by using at least a portion of the circuitry used to perform the up-converting operation. Furthermore, the mode selection module 532, as executed by processor 520, may deactivate the primary synthesizer of the AFE 510.

Figure 7:
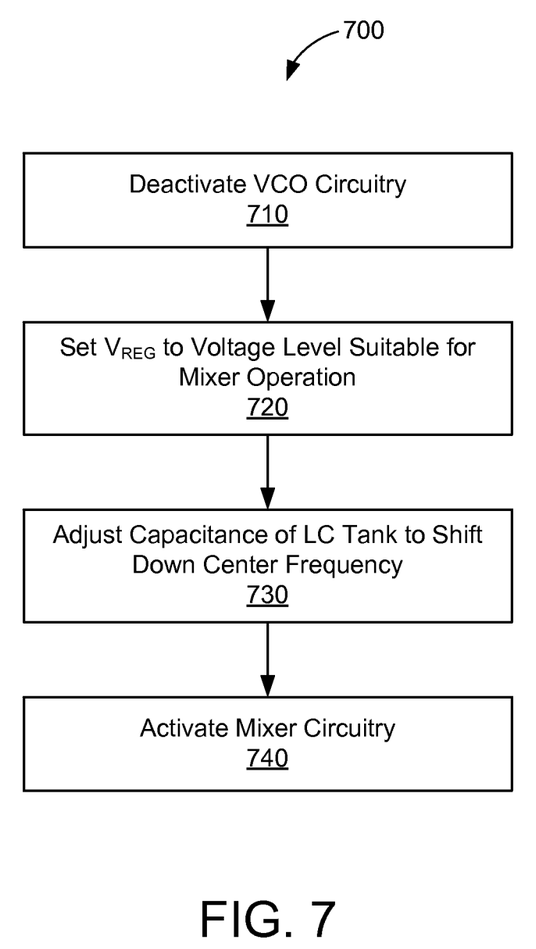
FIG. 7 shows an illustrative flow chart depicting a method of operating a dual-mode synthesizer as a mixer.

FIG. 7 shows an illustrative flow chart depicting a method 700 of operating a dual-mode synthesizer as a mixer. For example, with reference to FIG. 5, the method 700 may be performed by processor 520 with respect to AFE 510, which includes a dual-mode synthesizer such as the dual-mode synthesizer 400 shown in FIG. 4. For some embodiments, the method 700 may be performed by the processor 520 in executing the UPC control module 534.

The processor 520 first deactivates the VCO circuitry of the dual-mode synthesizer (710). For example, the processor 520 may deassert the LP_En signal, which turns off transistor 403 and effectively deactivates the VCO circuitry 420. The processor 520 then sets the output voltage $V_{REG}$ of the LDO 432 to a voltage level suitable for mixer operation (720). For example, the processor 520 may adjust the reference voltage $V_{REF}$ to raise the output voltage $V_{REG}$ to a voltage level substantially close to $V_{DD}$. For some embodiments, the processor 520 may adjust the capacitance of the LC tank to shift down the center frequency of the LC tank (730). For example, the processor 520 may activate one or more of switches SW1-SWn within the capacitor bank 422 to selectively decouple (or couple) one or more capacitors from the capacitor bank 422, for example, to reduce the frequency of the LC tank (e.g., formed by the capacitor bank 422 and inductors L1 and L2). Finally, the processor 520 may activate the mixer circuitry of the dual-mode synthesizer (740). For example, the processor 520 may provide an outgoing data signal and an LO signal (e.g., generated by a primary synthesizer) as inputs to the mixer circuitry 410.

Figure 8:
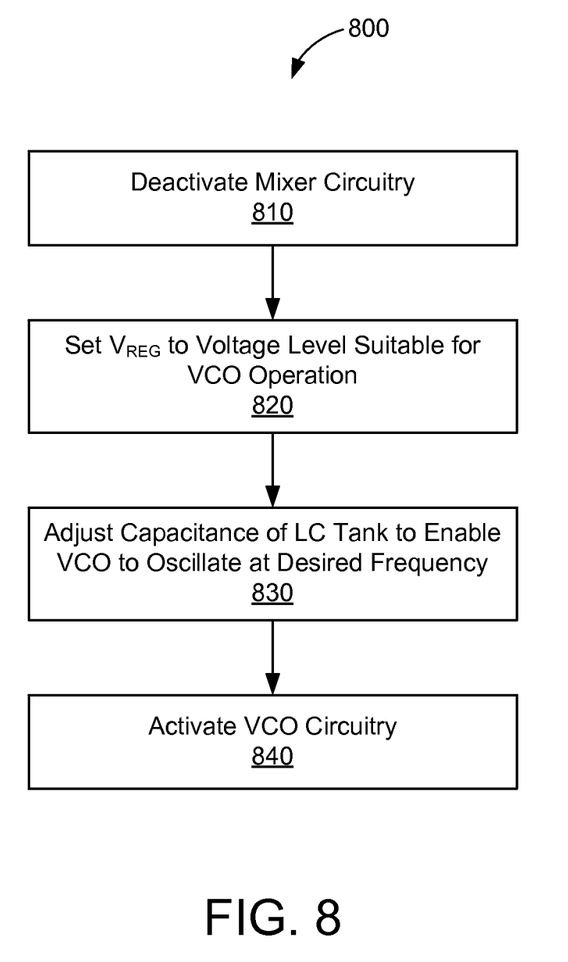
FIG. 8 shows an illustrative flow chart depicting a method of operating a dual-mode synthesizer as a frequency synthesizer.

FIG. 8 shows an illustrative flow chart depicting a method 800 of operating a dual-mode synthesizer as a frequency synthesizer. For example, with reference to FIG. 5, the method 800 may be performed by processor 520 with respect to AFE 510, which includes a dual-mode synthesizer such as the dual-mode synthesizer 400 shown in FIG. 4. For some embodiments, the method 800 may be performed by the processor 520 in executing the UPC control module 534.

The processor 520 first deactivates the mixer circuitry of the dual-mode synthesizer (810). For example, the processor 520 may pull the gate and source voltages of each of the transistors within the mixer circuitry 410 to ground potential. The processor 520 then sets the output voltage $V_{REG}$ of the LDO 432 to a voltage level suitable for frequency synthesizer operation (820). For example, the processor 520 may adjust the reference voltage $V_{REF}$ to lower the output voltage $V_{REG}$ to a desired voltage level that is below $V_{DD}$. For some embodiments, the processor 520 may adjust the capacitance of the LC tank to enable the VCO circuitry 420 to oscillate at a desired frequency (830). For example, the processor 520 may activate one or more of switches SW1-SWn within the capacitor bank 422 to selectively couple (or decouple) one or more capacitor pairs to the capacitor bank 422 to increase the frequency of the LC tank (e.g., formed by the capacitor bank 422 and inductors L1 and L2) to the desired frequency. Finally, the processor 520 may activate the VCO circuitry 420 of the dual-mode synthesizer (840). For example, the processor 520 may assert the LP_En signal, which turns on transistor 403 and effectively activates the VCO circuitry 420.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense. For example, the method steps depicted in the flow charts of FIGS. 6-8 may be performed in other suitable orders, multiple steps may be combined into a single step, and/or some steps may be omitted.

What is claimed is:

1. An analog front-end (AFE) for a communications device, the AFE comprising:
 a first frequency synthesizer coupled to a transmit (TX) chain and to a receive (RX) chain of the AFE, wherein the first frequency synthesizer is to generate a first local oscillator (LO) signal for transmitting or receiving carrier signals when the device is in a normal operating mode; and
 a second frequency synthesizer coupled to the RX chain and sharing one or more components of the TX chain, wherein the second frequency synthesizer is to utilize the one or more shared components to generate a second LO signal for receiving carrier signals when the device operates in a low-power mode.

2. The AFE of claim 1, wherein the second LO signal is used only for receiving beacon frames during one or more delivery traffic indication map (DTIM) periods.

3. The AFE of claim 1, wherein the TX chain comprises:
 a mixer powered by a voltage source coupled to a set of inductors, wherein the mixer is deactivated when the device operates in the low-power mode.

4. The AFE of claim 3, wherein at least one of the voltage source or the set of inductors is shared by the second frequency synthesizer.

5. The AFE of claim 4, wherein the second frequency synthesizer comprises:
 a voltage-controlled oscillator (VCO) to generate the second LO signal based at least in part on an oscillating current in an inductor-capacitor (LC) tank circuit, wherein the VCO is deactivated when the device operates in the normal operating mode.

6. The AFE of claim 5, wherein an inductance of the LC tank circuit is provided at least in part by the shared set of inductors.

7. The AFE of claim 5, where the VCO comprises:
 a set of capacitors to provide a capacitance of the LC tank circuit and to control an oscillating frequency of the VCO when the device operates in the low-power mode.

8. The AFE of claim 7, wherein the set of capacitors is to further shift down a center frequency of the LC tank circuit when the device operates in the normal operating mode.

9. The AFE of claim 5, wherein the shared voltage source is configured to provide one of a plurality of voltages based at least in part on an operating mode of the device.

10. The AFE of claim 9, wherein the shared voltage source is configured to provide a first voltage for operation of the mixer when the device operates in the normal operating mode, and wherein the shared voltage source is configured to provide a second voltage for operating the VCO when the device operates in the low-power mode.

11. A method of operating an analog front-end (AFE) for a communications device, the method comprising:
 activating a first frequency synthesizer of the AFE when the device operates in a normal operating mode, wherein the first frequency synthesizer is coupled to a transmit (TX) chain and to a receive (RX) chain of the AFE; and
 activating a second frequency synthesizer of the AFE when the device operates in a low-power mode, wherein the second frequency synthesizer utilizes one or more components of the TX chain to generate a local oscillator (LO) signal for processing carrier signals received via the RX chain during the low-power mode.

12. The method of claim 11, wherein the second frequency synthesizer is used only for receiving beacon frames during one or more delivery traffic indication map (DTIM) periods.

13. The method of claim 11, further comprising:
 deactivating a mixer provided in the TX chain when the device operates in the low-power mode, wherein the mixer is powered by a voltage source coupled to a set of inductors.

14. The method of claim 13, wherein at least one of the voltage source or the set of inductors is shared by the second frequency synthesizer and the TX chain.

15. The method of claim 14, further comprising:
 deactivating a voltage-controlled oscillator (VCO) of the second frequency synthesizer when the device operates in the normal operating mode, wherein the VCO generates the LO signal based at least in part on an oscillating current in an inductor-capacitor (LC) tank circuit.

16. The method of claim 15, wherein an inductance of the LC tank circuit is provided at least in part by the shared set of inductors.

17. The method of claim 15, further comprising:
 adjusting a capacitance of the LC tank circuit to enable the VCO to oscillate at a desired frequency when the device operates in the low-power mode.

18. The method of claim 17, further comprising:
 adjusting the capacitance to shift down a center frequency of the LC tank circuit when the device operates in the normal operating mode.

19. The method of claim 15, wherein the shared voltage source is configured to provide one of a plurality of voltages based at least in part on an operating mode of the device.

20. The method of claim 19, further comprising:
 configuring the shared voltage source to provide a first voltage for operation of the mixer when the device operates in the normal operating mode; and
 configuring the shared voltage source to provide a second voltage for operation of the VCO when the device operates in the low-power mode.

21. An analog front-end (AFE) for a communications device, the AFE comprising:
 means for activating a first frequency synthesizer of the AFE when the device operates in a normal operating mode, wherein the first frequency synthesizer is coupled to a transmit (TX) chain and to a receive (RX) chain of the AFE; and
 means for activating a second frequency synthesizer of the AFE when the device operates in a low-power mode, wherein the second frequency synthesizer utilizes one or more components of the TX chain to generate a local oscillator (LO) signal for processing carrier signals received via the RX chain during the low-power mode.

22. The AFE of claim 21, wherein the second frequency synthesizer is used only for receiving beacon frames during one or more delivery traffic indication map (DTIM) periods.

23. The AFE of claim 21, further comprising:
 means for deactivating a mixer provided in the TX chain when the device operates in the low-power mode, wherein the mixer is powered by a voltage source coupled to a set of inductors.

24. The AFE of claim 23, wherein at least one of the voltage source or the set of inductors is shared by the second frequency synthesizer and the TX chain.

25. The AFE of claim 24, further comprising:
 means for deactivating a voltage-controlled oscillator (VCO) of the second frequency synthesizer when the device operates in the normal operating mode, wherein the VCO generates the LO signal based at least in part on an oscillating current in an inductor-capacitor (LC) tank circuit.

26. The AFE of claim 25, wherein an inductance of the LC tank circuit is provided at least in part by the shared set of inductors.

27. The AFE of claim 25, further comprising:
means for adjusting a capacitance of the LC tank circuit to enable the VCO to oscillate at a desired frequency when the device operates in the low-power mode.

28. The AFE of claim 27, further comprising:
means for adjusting the capacitance to shift down a center frequency of the LC tank circuit when the device operates in the normal operating mode.

29. The AFE of claim 25, wherein the shared voltage source is configured to provide one of a plurality of voltages based at least in part on an operating mode of the device.

30. A non-transitory computer-readable storage medium containing program instructions that, when executed by a processor provided within a communications device, causes the device to:
activate a first frequency synthesizer of an analog front-end (AFE) of the device when the device operates in a normal operating mode, wherein the first frequency synthesizer is coupled to a transmit (TX) chain and to a receive (RX) chain of the AFE; and
activate a second frequency synthesizer of the AFE when the device operates in a low-power mode, wherein the second frequency synthesizer utilizes one or more components of the TX chain to generate a local oscillator (LO) signal for processing carrier signals received via the RX chain during the low-power mode.

* * * * *